United States Patent [19]

Ceylan

[11] Patent Number: 5,769,659
[45] Date of Patent: Jun. 23, 1998

[54] PLASTIC TERMINAL BOX

[75] Inventor: Muzaffer Ceylan, Alsdorf, Germany

[73] Assignee: Copeland Corporation, Sidney, Ohio

[21] Appl. No.: 571,369

[22] Filed: Dec. 13, 1995

[51] Int. Cl.⁶ .................................................. H01R 13/52
[52] U.S. Cl. .......................................... 439/521; 439/718
[58] Field of Search .................................. 439/521, 559, 439/564, 367, 685, 638, 639, 689, 690, 271, 718

[56] References Cited

U.S. PATENT DOCUMENTS

| | | | |
|---|---|---|---|
| 4,059,325 | 11/1977 | Diminnie et al. | 439/519 |
| 4,109,992 | 8/1978 | Hughes et al. | 439/620 |
| 4,227,764 | 10/1980 | Fiske | 439/367 |
| 4,252,394 | 2/1981 | Miller | 439/566 |
| 4,523,798 | 6/1985 | Barrows et al. | 439/685 |
| 4,584,433 | 4/1986 | Bowsky et al. | 174/152 |
| 4,654,470 | 3/1987 | Feldman et al. | 174/50 |
| 4,712,157 | 12/1987 | Simonson et al. | 361/357 |
| 4,827,502 | 5/1989 | Suffi et al. | 379/331 |
| 4,840,547 | 6/1989 | Fry | 417/422 |
| 4,915,638 | 4/1990 | Domian | 439/367 |
| 4,921,454 | 5/1990 | Atherton et al. | 439/685 |
| 4,984,973 | 1/1991 | Itameri-Kinter et al. | 417/422 |
| 4,998,891 | 3/1991 | Bresko | 439/369 |
| 5,007,854 | 4/1991 | Crespiatico et al. | 439/367 |
| 5,035,653 | 7/1991 | Honkomp et al. | 439/622 |
| 5,084,596 | 1/1992 | Borsh et al. | 174/53 |
| 5,091,821 | 2/1992 | Peyton | 361/380 |
| 5,126,608 | 6/1992 | Sogabe et al. | 310/71 |
| 5,129,843 | 7/1992 | Bowsky et al. | 439/685 |
| 5,145,388 | 9/1992 | Brownlie et l. | 439/142 |
| 5,145,417 | 9/1992 | Honkomp et al. | 439/685 |
| 5,173,057 | 12/1992 | Bunch et al. | 439/685 |
| 5,199,898 | 4/1993 | Wisner | 439/367 |
| 5,239,129 | 8/1993 | Ehrenfels | 174/51 |
| 5,244,408 | 9/1993 | Muller et al. | 439/460 |
| 5,252,083 | 10/1993 | Correnti | 439/367 |
| 5,256,072 | 10/1993 | Hatagishi | 439/79 |
| 5,272,297 | 12/1993 | Reichow et al. | 200/549 |
| 5,336,105 | 8/1994 | Wisner | 439/367 |
| 5,391,061 | 2/1995 | Iizuka et al. | 417/410.1 |
| 5,430,619 | 7/1995 | Lindenbaum | 361/823 |

*Primary Examiner*—Hien Vu
*Attorney, Agent, or Firm*—Harness, Dickey & Pierce, P.L.C.

[57] ABSTRACT

A plastic terminal box is secured to a shell of a working machine. The plastic terminal box includes a plastic body which is secure to the shell and a plastic cover which is sealingly and releasably secured to the plastic body. The plastic body defines an aperture into which is inserted an electrical terminal of the working machine. A seal is located around the terminal and between the shell and the plastic body. The terminal and its associated electrical connections are thus isolated by the plastic terminal box due to the seal between the body and the shell and by the seal between the cover and the body.

11 Claims, 4 Drawing Sheets

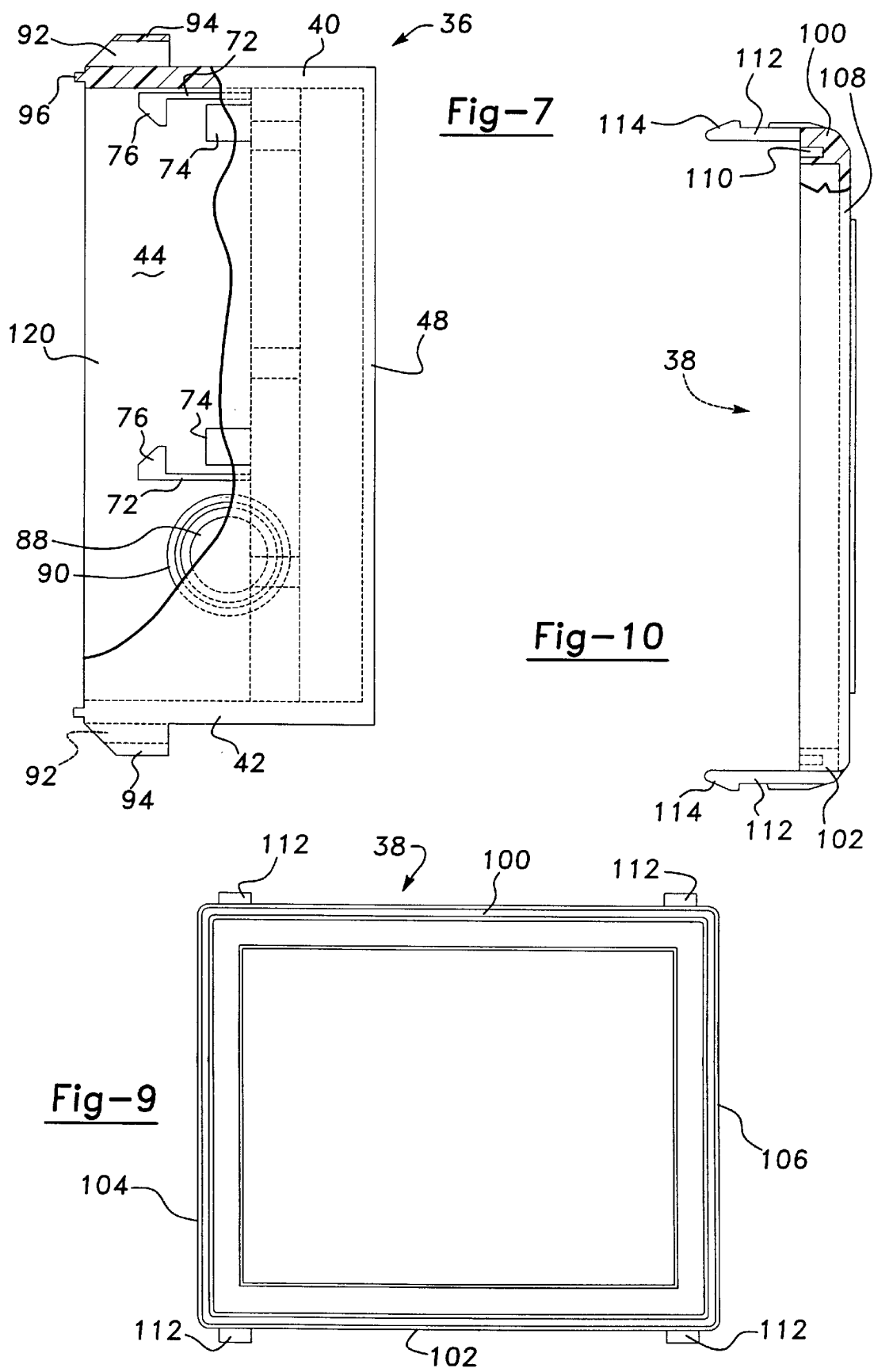

PLASTIC TERMINAL BOX

FIELD OF THE INVENTION

The present invention relates to a terminal box for protecting the electrical connections for a hermetic compressor. More specifically, the present invention relates to a terminal box for sealing and protecting the electrical connections for a hermetic compressor which is constructed from plastic.

BACKGROUND AND SUMMARY OF THE INVENTION

Hermetically sealed compressors are frequently located in environments where it becomes necessary to protect the connections for the electrical system in order to avoid corrosion of the terminals or the like. Typical electrical connections for a hermetically sealed compressor include power lines for running the motor which operates the compressor and control circuitry which monitors the operation of the compressor to shut down the compressor when an out of specification event is detected.

Prior art compressors include a stamped metal box which is normally spot welded to the outside of the hermetic shell of the compressor. Prior to being welded to the shell of the hermetic compressor, the box is open on both ends allowing for placement of the box over the electrical terminals extending from the hermetic shell while providing access from outside the shell to the electrical terminals to facilitate the wiring from an external power source to the compressor. At least one side of the box is provided with knockouts for allowing access to the inside of the box and the electric terminals by power and/or control lines. The knockouts provided in the box are stamped to provide the electrician with a plurality of sizes of holes to be knocked out as is typical in the electrical industry. Once a hole has been knocked out, a suitable connector is utilized which both retains and seals the electrical cables passing into the box. Once the proper electrical connections have been made, a stamped steel cover is assembled to close the outside opening in the end of the box by using a plurality of screws or other fasteners.

While these prior art stamped steel terminal boxes have been successful in protecting the electrical connections, there has also been some problems arising from their use. Typical problems associated with the use of these stamped steel terminal boxes have been the quality of the sealing systems associated with these boxes and the corrosion of the box itself.

The quality of the sealing systems for these boxes has always been an issue. The terminal box is spot welded to the outer surface of the shell in three or more places along each side of the box. Thus, there is a need to seal the entire circumference of the interface between the box and the shell in order to isolate the interior of the box. This sealing of the four ends of the box with the outer surface of the shell can be accomplished by adding a seal after the welding operation or designing a seal which is not affected by the heat from the welding operation. Both of these options are time consuming and expensive and often there is no seal placed between the box and the shell. Without a seal in place, moisture can easily pass to the interior of the box and cause the corrosion of the electrical terminals and their connections.

In addition to the problems of sealing between the box and the outside of the shell, special precautions need to be taken in the area of the electrical knockouts. A typical electrical knockout includes a plurality of through punched or through cut concentric circles with the knockouts being kept in place due to localized non-stamped tab portions positioned at one or more places around the circumference of the circular through cuts. Thus, the connector which is used must not only be able to seal around the electrical cable, it must also provide the seal for the knockouts which are left in the box when a smaller than maximum sized hole is desired.

Along with the problems of sealing, the stamped steel terminal box is also plagued by its susceptibility to rust. Regardless of how well the system is sealed and/or painted, over time, rust will begin and provide a non-aesthetically pleasing appearance to the compressor assembly. If this rusting is not curtailed, it will eventually extend through the stamped steel cover providing additional leakage paths for moisture and condensation. Thus in order to limit the extent of rusting, continued periodical maintenance of the compressor assembly is required.

Accordingly, the present invention provides the art with a terminal box which is made from plastic and is therefor not susceptible to the rusting problems of its stamped steel counterpart. The plastic terminal box of the present invention includes a plurality of generally circular polymeric sealing members which seal between the terminal box and the outer surface of the shell. The polymeric sealing members surround each terminal assembly of the hermetic compressor to provide localized sealed areas for isolating the interior of the terminal box. At least one wall of the terminal box defines a knockout by having a plurality of concentric grooves molded into the wall. Thus when a specific knockout is removed, the remaining knockouts do not require additional sealing and the electrical connector can be designed to seal only around the wires and around the specific sized hole within which it is designed to be installed. The terminal box of the present invention includes a cover which has a plurality of male clips which are received within female apertures to retain the cover. The cover mates with the body of the terminal box in a tongue-in-groove fashion to complete the isolation of the interior of the terminal box thus providing for the corrosion protection for the electrical terminals and connections.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 7 is a side end elevational view, partially in cross section of the body shown in FIGS. 5 and 6;

FIG. 9 is a front elevational view of the cover of the plastic terminal box in accordance with the present invention; and FIG. 10 is a side elevational view, partially in cross section, of the cover shown in FIG. 9.

DETAILED DESCRIPTION OF THE PREFERRED EMBODIMENTS

Figure 1:
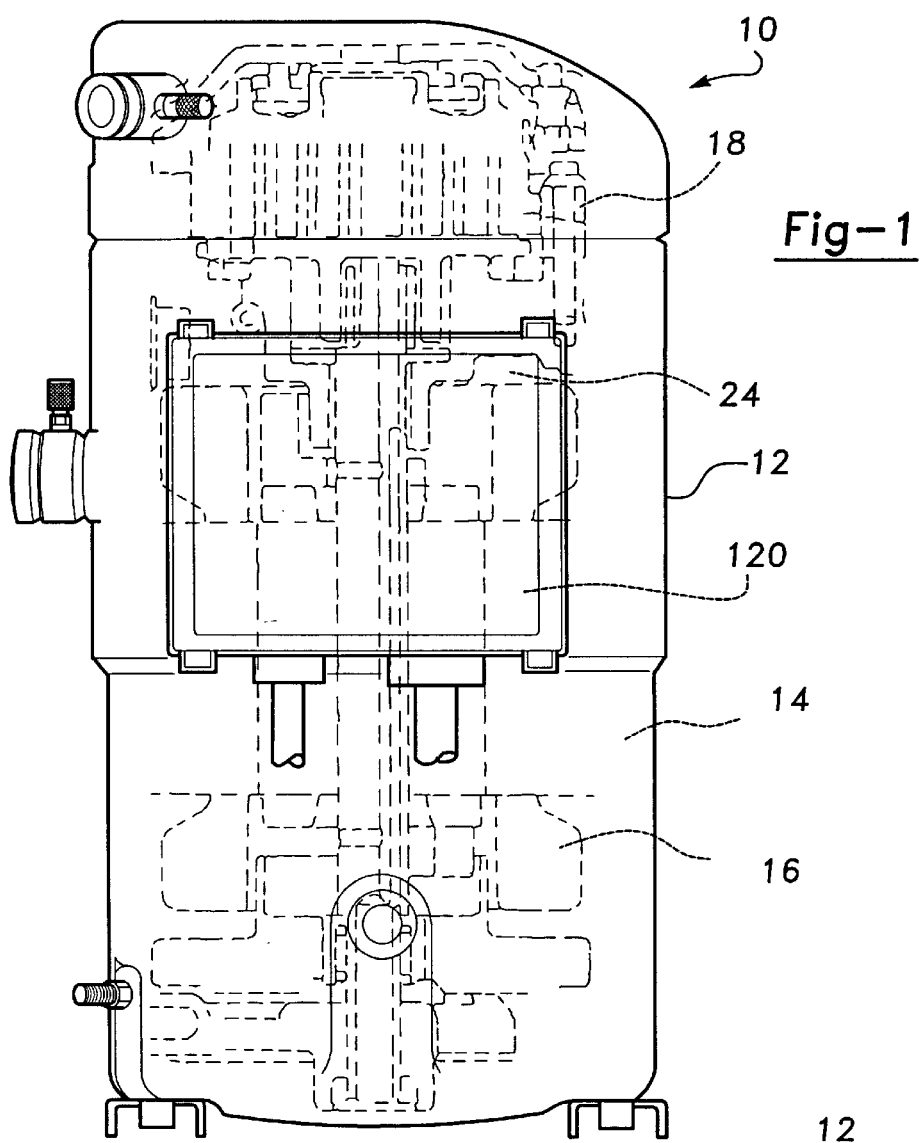
FIG. 1 is a side elevational view of a compressor incorporating the plastic terminal box in accordance with the present invention.
Figure 2:
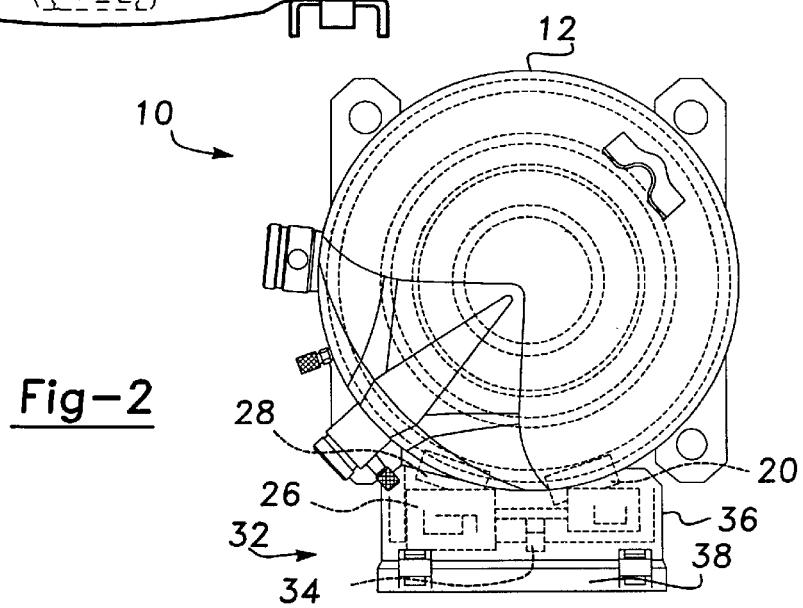
FIG. 2 is a top plan view of the compressor and terminal box shown in FIG. 1.
Figure 3:
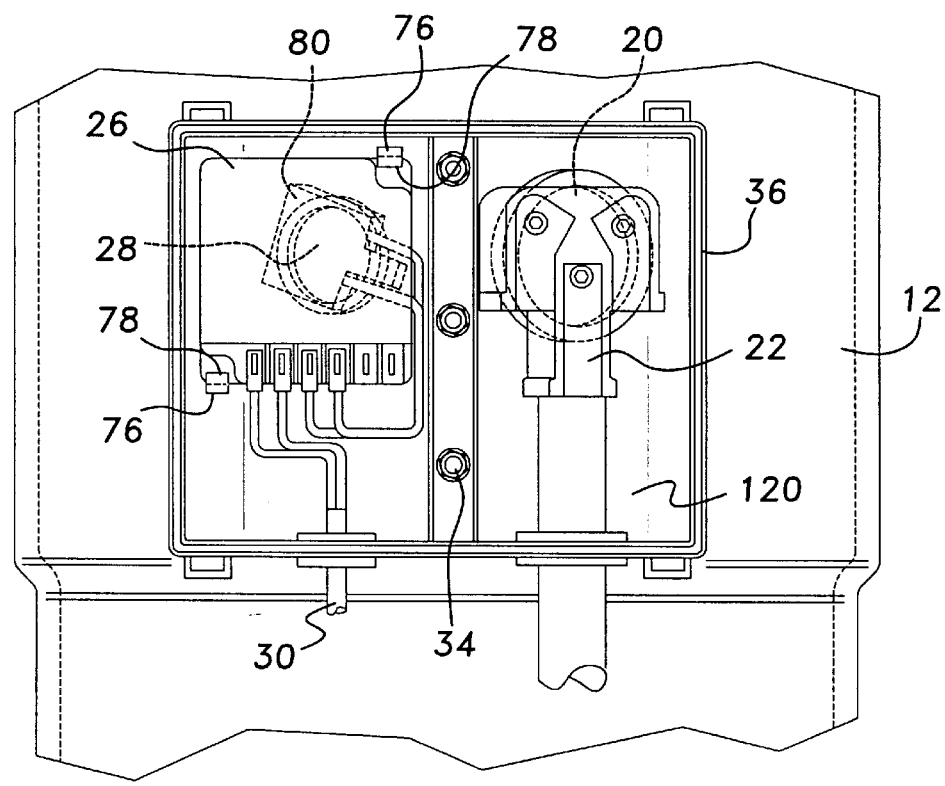
FIG. 3 is an enlarged side elevational view of the plastic terminal box shown in FIGS. 1 and 2 with the terminal box cover removed.
Figure 4:
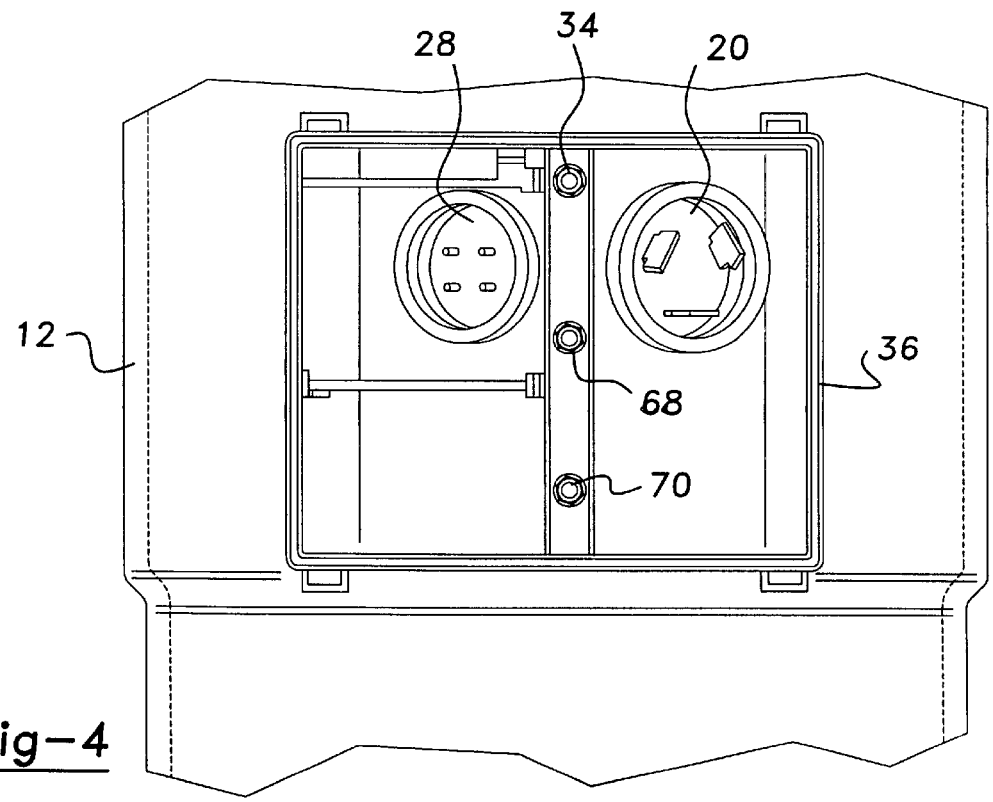
FIG. 4 is an enlarged side elevational view, similar to FIG. 3, but with the plug and the protector model removed.

Referring now to the drawings in which like reference numerals designate like or corresponding parts throughout the several views, there is shown in FIGS. 1 and 2, a hermetic compressor assembly which is designated generally by the reference numeral 10. Compressor assembly 10 can be a scroll compressor, a piston compressor or any other type of compressor. Compressor assembly 10 comprises a hermetic shell 12 which defines a sealed chamber 14 within which a motor 16 and a compressor 18 are disposed. For exemplary purposes, compressor 18 is depicted as a scroll compressor but it is to be understood that the present invention is not limited to a scroll compressor. Compressor 10 further comprises a terminal block 20 (FIG. 4) which is sealingly associated with compressor 10 and which provides for the electrical connection between an external source of power (not shown) and motor 16 disposed within sealed chamber 14 through a plug 22. A motor/compressor temperature protection system 24 is disposed within sealed chamber 14 and is in electrical communication with a protector module 26 which is located outside of sealed chamber 14. Protector module 26 is in communication with protection system 24 through a terminal connector 28. Protector module 26 is in turn connected to the appropriate control circuitry through a cable 30.

A plastic terminal box 32 is fixedly secured to shell 12 in order to house and isolate terminal assembly 20, protector module 26, terminal connector 28 as well as the electrical connections between terminal assembly 20 and plug 22 and those between protection system 24, protector module 26 and cable 30. A plurality of threaded studs 34 are projection welded to shell 12 and provide the mounting means for terminal box 32. Terminal box 32 comprises a generally rectangular box shaped plastic body 36 and a plastic cover 38. Plastic body 36 and plastic cover 38 are preferably manufactured from Polyamid PA6 with 25% glass fiber although other plastics may also be acceptable.

Referring now to FIGS. 5 through 8, body 36 is a generally rectangular box shaped component which includes an upper wall 40, a lower wall 42, a pair of side walls 44 and 46 and a rear wall 48. Upper wall 40, lower wall 42 and the pair of side walls 44 and 46 define a chamber 49 which includes a closed end 51 closed by rear wall 48 and an open end 53 adapted to receive plastic cover 38. Rear wall 48 abuts shell 12 and includes a pair of angled portions 50 and 52 which are designed for conformance to the cylindrical outer surface of shell 12. Each angled portion 50 and 52 define a recessed aperture 54 and 56, respectively, which are sized and positioned such that aperture 54 encircles terminal assembly 20 and aperture 56 encircles terminal connector 28 of protection system 24. A polymeric seal 58 is fixedly secured to the recessed area around aperture 54 and a polymeric seal 60 is fixedly secured to the recessed area around aperture 56. When body 36 is secured to shell 12 using studs 34, seal 58 sealing engages shell 12 in the area around terminal assembly 20 to isolate terminal assembly 20 from the environment around the exterior body 36. In a similar manner, seal 60 sealingly engages shell 12 in the area around terminal connector 28 to isolate terminal connector 28 from the environment around the exterior of body 36. A recessed area 62 is located between angled portions 50 and 52. Recessed area 62 includes a longitudinally extending wall 64 which defines a plurality of slotted apertures 66 each of which are designed for mating with a corresponding stud 34 extending from shell 12. Body 36 is secured to shell 12 by positioning body 36 such that studs 34 are located within recesses area 62. Studs 34 are then aligned with their respective aperture 66 and once positioned on studs 34, a polymeric washer 68 and a self-locking nut 70 having a nylon insert are assembled to studs 34 to retain body 36 on shell 12. The tightening of nut 70 onto their corresponding stud 34 compresses seals 58 and 60 between shell 12 and body 36 to provide the sealing engagement of body 36 with shell 12. The tightening of nuts 70 also seals the interface between studs 34 and body 36 due to the compression of washers 68. The nylon inserts associated with self-locking nuts 70 complete the sealing of the interface between studs 34 and body 36. One of studs 34 is extended in length to provide for the grounding connection for compressor 10. As illustrated, compressor 10 has the lower stud 34 extended to provide for the grounding connection but it is within the scope of the present invention to extend any of the studs 34 for this purpose.

Figure 5:
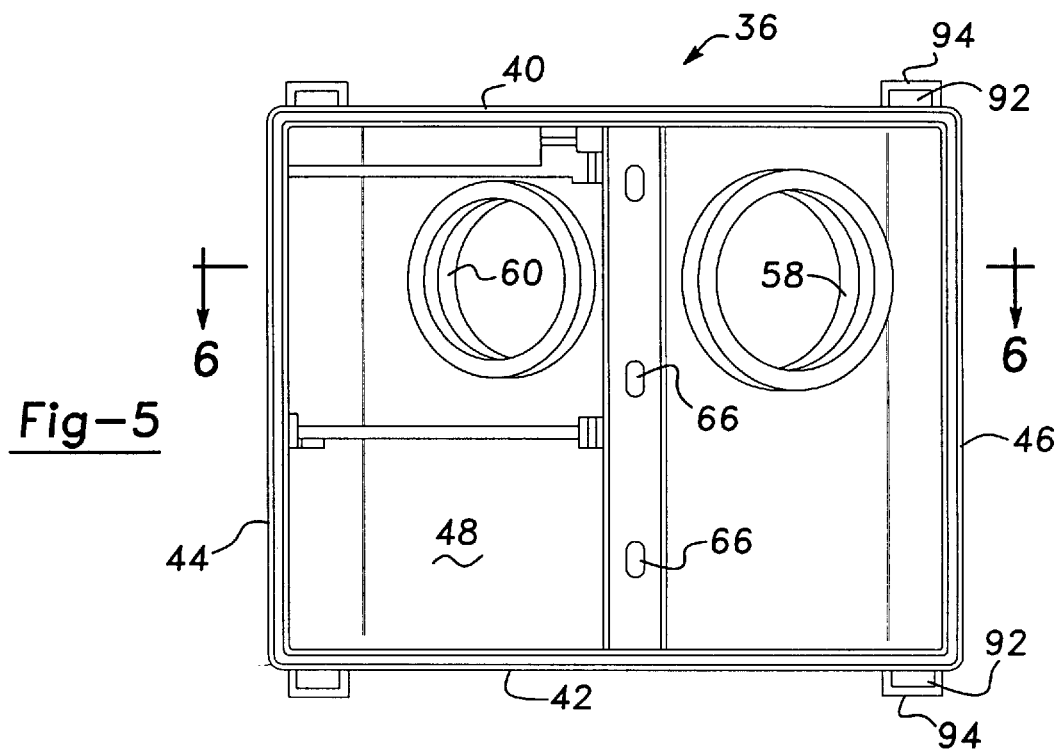
FIG. 5 is a front elevational view of the body of the plastic terminal box in accordance with the present invention.
Figure 6:
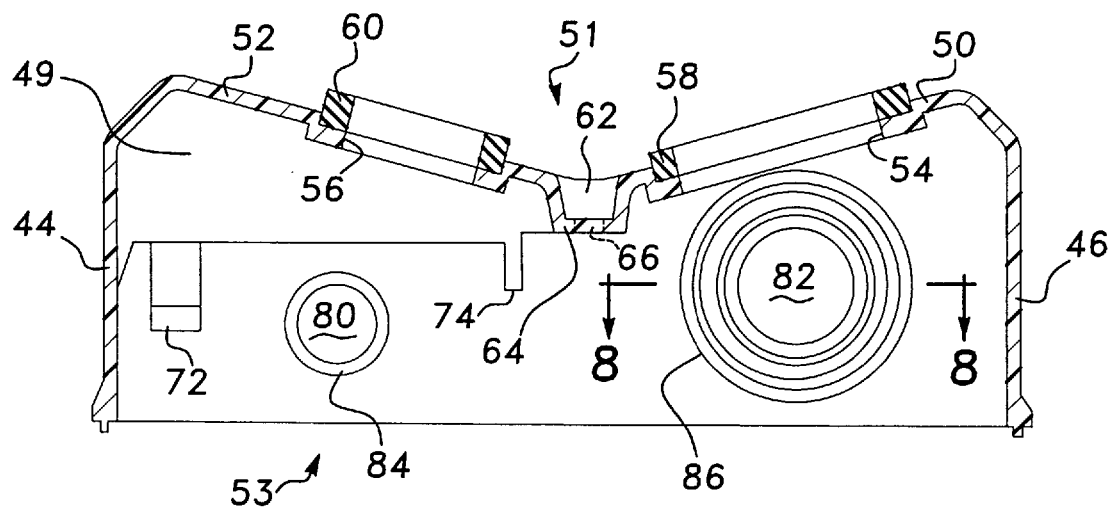
FIG. 6 is an end elevational view of the body shown in FIG. 5 taken in the direction of arrows 6—6 shown in FIG. 5.
Figure 8:
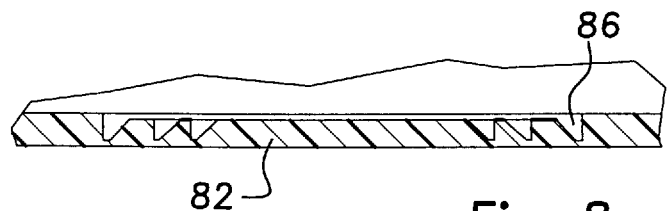
FIG. 8 is an enlarged sectional view taken in the direction of arrow 8—8 in FIG. 6.

As described earlier, compressor protection system 24 (FIGS. 1–4) is in communication with protector module 26. As shown in FIGS. 5 through 7, body 36 includes a pair of flexible retaining clips 72 which are integrally formed with body 36 as well as a pair of supporting surfaces 74 which are also integrally formed with body 36. Retaining clips 72 include a hook shaped end configuration 76 and are located such that they extend through a corresponding pair of apertures or slots 78 located within protector module 26. Module 26 is assembled into body 36 by first assembling a cluster block 80 to terminal connector 28. Cluster block 80 includes the wiring necessary for electrically connecting protector module 26 to protection system 24. Module 26 is then assembled to body 36 by inserting retaining clips 72 within their corresponding apertures 78. The insertion of clips 72 with apertures 78 flexes clips 72 outward as module 26 is assembled. The insertion of clips 72 into apertures 78 continues until module 26 contacts supporting surfaces 74. At this point, hook shaped end configuration 76 of each retaining clip 72 extends completely through the corresponding aperture 78 and each clip 72 snaps into engagement with module 26 to retain module 26 within body 36 against supporting surfaces 74.

Lower wall 42 defines a pair of knock-outs 80 and 82 which are provided to allow access to the interior of box 32 for wiring purposes. Knock-out 80 is a single size knock-out which is defined by a circular groove 84. Groove 84 provides a reduced wall thickness area facilitating the removal of knock-out 80 and the forming of a circular aperture when knock-out 80 is removed. Knock-out 82 is a multiple size knock-out which is defined by a plurality of concentric circular grooves 86. Each groove 86 provides a reduced wall thickness area facilitating the removal of knock-out 82 and the forming of a circular aperture when knock-out 82 is removed. The plurality of grooves 86 allow an individual to size the resulting aperture to mate with the corresponding connector which is to be installed. Once the appropriate knock-out 80 and/or 82 has been removed and the appropriate sealed connectors positioned within the resulting aperture, the sealed integrity of box 32 is maintained without the need for additional sealing around the unused grooves 84 and/or 86.

Side wall 44 also defines a knock-out 88 which is provided to allow an alternate or additional access to the interior of box 32 for wiring purposes. Knock-out 88 is a multiple size knock-out which is defined by a plurality of concentric circular grooves 90. Each groove 90 provided a reduced wall thickness area facilitating the removal of knock-out 88 and the forming of a circular aperture when knock-out 82 is removed. The plurality of grooves allow an individual to size the resulting aperture to mate with the corresponding connector which is to be installed. Once the appropriate knock-out 88 has been removed and the appropriate sealed connection positioned within the resulting aperture, the sealed integrity of box 32 is maintained without the need for additional sealing around the unused grooves 90.

Upper and lower wall 40 and 42 are each provided with a pair of apertures 92 which are formed by a generally U-shaped member 94 integrally molded with body 36. Each aperture 92 is located at one of the corners of body 36 and are provided for mating with and retaining cover 38 as will be described later herein. The front edge of upper wall 40, lower wall 42, and the pair of side walls 44 and 46 define a continuous annular ridge 96 which mates with cover 38 to provide the for the sealing of the internal chamber defined by box 32.

Referring now to FIGS. 9 and 10, cover 38 is a generally rectangular box shaped component which includes an upper wall 100, a lower wall 102, a pair of side walls 104 and 106 and a front wall 108. The front edge of upper wall 100, lower wall 102 and the pair of side walls 104 and 106 define a continuous groove 110 which mates with ridge 96 to provide a tongue-in-groove seal between cover 38 and body 36 when they are assembled. Cover 38 includes four flexible retaining clips 112 which are integrally formed with cover 38. Retaining clips 1 12 each include a hook shaped end configuration 114 and are positioned on cover 38 such that they align with a corresponding aperture 92 formed on body 36 by U-shaped members 94. Cover 38 is assembled to body 36 by inserting retaining clips 112 within their corresponding aperture 92. The insertion of clips 72 within apertures 92 flexes clips 112 as cover 38 is assembled. The insertion of clips 112 into apertures 92 continues until ridge 96 extends into groove 110. At this point, hook shaped end configuration 114 of each retaining clip 112 extends completely through the corresponding aperture 92 and each clip 112 snaps into engagement with U-shaped member 94 of body 36 to retain cover 38 onto body 36 and insure the sealed integrity of box 32 due to the engagement of ridge 96 with groove 110.

Thus, terminal box 32 provides a sealed chamber 120 for the protection of terminal assembly 20, protector module 26, terminal connector 28 and the associated electrical connections. The sealed integrity of chamber 120 is maintained by seal 58, seal 60 washer 68, nut 70 and the tongue-in-groove connection between ridge 96 and groove 110. Plastic terminal box 32 is lower in manufacturing cost than the prior art metallic terminal boxes and lower in cost in assembly due to the elimination of the high labor content of the prior art metal box necessary to meet the sealing classification rating required of the terminal box.

While the above detailed description describes the preferred embodiment of the present invention, it should be understood that the present invention is susceptible to modification, variation and alteration without deviating from the scope and fair meaning of the subjoined claims.

What is claimed is:

1. A terminal assembly for a compressor having a shell, said terminal assembly comprising:
    a terminal block secured to said shell;
    a plastic terminal box secured to said shell , said plastic terminal box comprising:
        a plastic body secured to said shell, said plastic body including a generally rectangular wall defining a chamber, an open end and a closed end having an aperture, said terminal block extending into said chamber through said aperture, said terminal block being accessible through said open end of said plastic body, said plastic body includes at least one clip integrally formed with said plastic body within said chamber, said clip operable to position and retain a module within said chamber;
        a seal disposed around said terminal block between said shell and said plastic body, said seal isolating said chamber from an environment surrounding said terminal assembly; and
        a plastic cover releasably secured to said open end of said plastic body, said plastic cover closing said open end and isolating said chamber from said environment surrounding said terminal assembly.

2. The terminal assembly according to claim 1 wherein, said shell includes at least one threaded stud extending through said plastic body and into said chamber, said plastic body being secured to said shell by a nut threadingly engaging said stud within said chamber.

3. The terminal assembly according to claim 2 wherein, said threaded stud is a grounding lug for said compressor.

4. The terminal assembly according to claim 1 wherein, said plastic body includes at least one integral supporting surface for locating a module within said chamber.

5. The terminal assembly according to claim 1 wherein, one of said plastic body and said plastic cover defines a plurality of apertures and the other of said plastic body and said plastic cover defines a plurality of integrally formed clips, said clips extending into said apertures and releasably engaging said one of said plastic body and said plastic cover for securing said plastic cover to said plastic body.

6. The terminal assembly according to claim 1 wherein, one of said plastic body and said plastic cover defines an annular ridge and the other of said plastic body and said plastic cover defines an annular groove, said annular ridge engaging said annular groove to isolate said chamber when said plastic cover is assembled to said plastic body.

7. The terminal assembly according to claim 1 wherein, said shell defines a cylindrical outer surface and said plastic body includes a pair of angled portions which mate with said cylindrical outer surface.

8. The terminal assembly according to claim 1 wherein, said plastic body is made from Polyamid PA6 with 25% glass fiber.

9. A terminal assembly for a compressor having a shell, said shell defining a cylindrical outer surface, said terminal assembly comprising:
    a terminal block secured to said shell;
    a terminal connector secured to said shell;
    a plastic terminal box secured to said shell and defining a chamber, said terminal block and said terminal connector being disposed within said chamber, said plastic terminal box comprising:
        a plastic body secured to said shell, said plastic body defining a generally V-shaped surface having a first and a second aperture; said terminal block extending through said first aperture, said terminal connector extending through said second aperture;
    a first seal disposed around said terminal block between said shell and said plastic body, said first seal isolating said chamber from the environment surrounding said terminal assembly;
    a second seal disposed around said terminal connector between said shell and said plastic body, said second seal isolating said chamber from the environment surrounding said terminal assembly; and a plastic cover releasably secured to said plastic body, said plastic cover closing said chamber and isolating said chamber from the environment surrounding said terminal assembly.

10. The terminal assembly according to claim 9 wherein, said plastic body is made from Polyamid 66 with 25% glass fiber.

11. A terminal assembly for a compressor having a shell, said terminal assembly comprising:

a terminal block secured to said shell;

a plastic terminal box secured to said shell, said plastic terminal box comprising:
- a plastic body secured to said shell, said plastic body including a generally rectangular wall defining a chamber, an open end and a closed end having an aperture, said terminal block extending into said chamber through said aperture, said terminal block being accessible through said open end of said plastic body;
- a threaded stud extending through said plastic body and into said chamber, said threaded stud being a grounding lug for said compressor, said plastic body being secured to said shell by a nut threadingly engaging said stud within said chamber,
- a seal disposed around said terminal block between said shell and said plastic body, said seal isolating said chamber from an environment surrounding said terminal assembly; and
- a plastic cover releasably secured to said open end of said plastic body, said plastic cover closing said open end and isolating said chamber from said environment surrounding said terminal assembly.

* * * * *

UNITED STATES PATENT AND TRADEMARK OFFICE
CERTIFICATE OF CORRECTION

PATENT NO. : 5,769,659
DATED : June 23, 1998
INVENTOR(S) : Muzaffer Ceylan

It is certified that error appears in the above-indentified patent and that said Letters Patent is hereby corrected as shown below:

On the Title Page, under U.S. Patent Documents, reference 5,145,388, "l." should be -- al. --.

Column 2, line 19, "therefor" should be -- therefore --.

Column 3, line 35, "assembly" should be -- block --.

Column 3, line 37, "assembly" should be -- block --.

Column 3, line 58, "assembly" should be -- block --.

Column 3, line 63, "sealing" should be -- sealingly --.

Column 3, line 64, "assembly" (first occurrence) should be -- block --.

Column 3, line 64, "assembly" (second occurrence) should be -- block --.

Column 4, line 8, "recesses" should be -- recessed --.

UNITED STATES PATENT AND TRADEMARK OFFICE
CERTIFICATE OF CORRECTION

PATENT NO. : 5,769,659
DATED : June 23, 1998
INVENTOR(S) : Muzaffer Ceylan

It is certified that error appears in the above-indentified patent and that said Letters Patent is hereby corrected as shown below:

Column 5, line 20, delete "the" (first occurrence).

Column 5, line 32, "1 12" should be -- 112 --.

Column 6, line 7, "includes" should be -- including --.

Signed and Sealed this

Thirteenth Day of July, 1999

Attest:

Q. TODD DICKINSON

Attesting Officer

Acting Commissioner of Patents and Trademarks